Sept. 26, 1972   W. A. HOEF   3,694,280
METHOD OF FORMING AN END TAPER ON PLASTIC TUBING
Filed May 1, 1970   3 Sheets-Sheet 1

INVENTOR
WILLIAM A. HOEF
BY Joseph Weingarten
Lawrence A. Maxham
ATTORNEYS

INVENTOR
WILLIAM A. HOEF

ATTORNEYS

Sept. 26, 1972  W. A. HOEF  3,694,280
METHOD OF FORMING AN END TAPER ON PLASTIC TUBING
Filed May 1, 1970  3 Sheets-Sheet 3
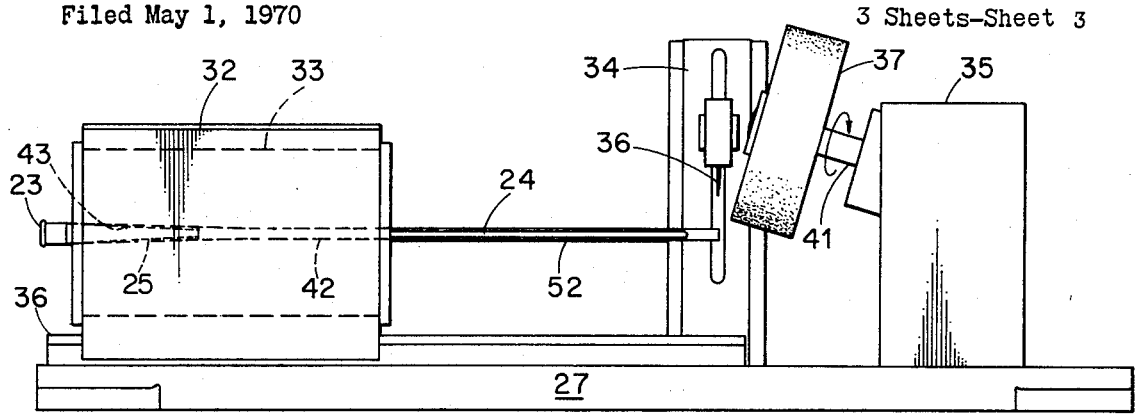
Fig. 10.
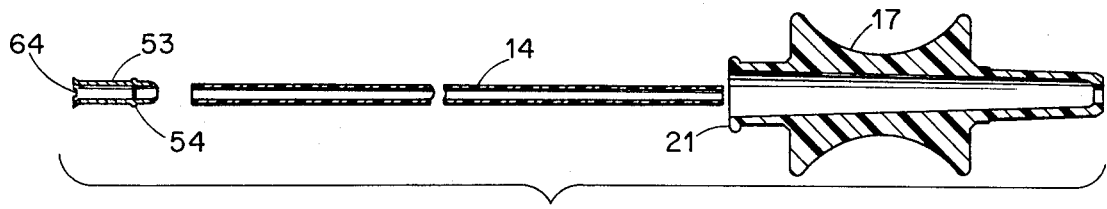
Fig. 11.
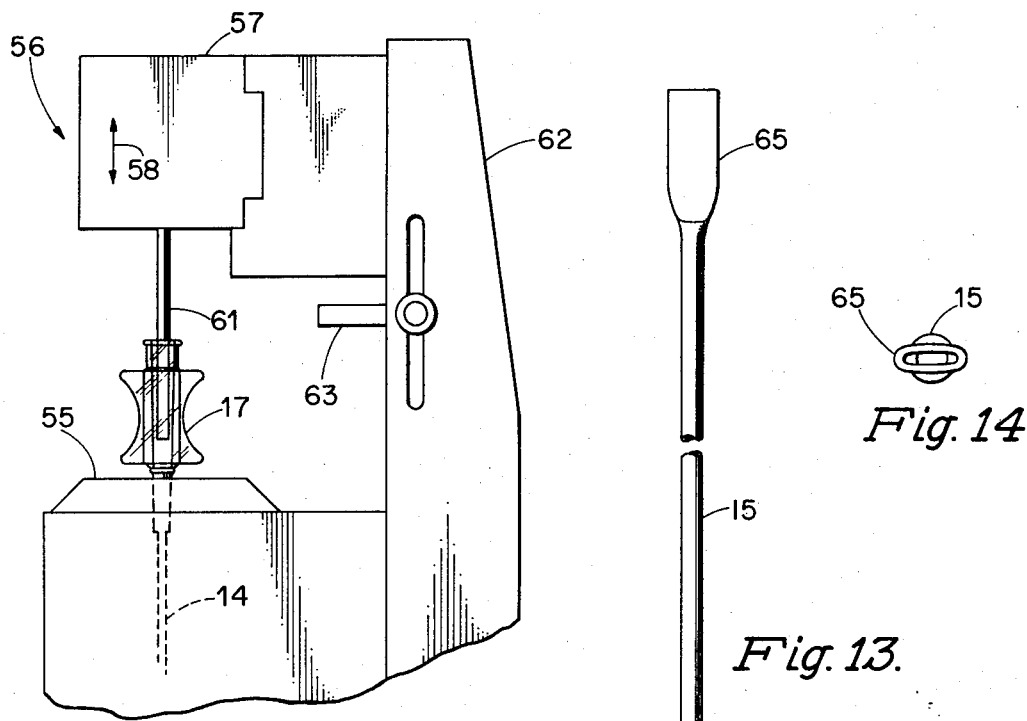
Fig. 12.
Fig. 13.
Fig. 14.
INVENTOR
WILLIAM A. HOEF
BY Joseph Weingarten
Lawrence A. Maxham
ATTORNEYS United States Patent Office 3,694,280
Patented Sept. 26, 1972

3,694,280
METHOD OF FORMING AN END TAPER ON PLASTIC TUBING
William A. Hoef, Groton, Conn., assignor to Edward Weck & Company, Inc., Long Island City, N.Y.
Filed May 1, 1970, Ser. No. 33,690
Int. Cl. B32b *19/16, 31/26*
U.S. Cl. 156—73
16 Claims

ABSTRACT OF THE DISCLOSURE

A methods for manufacturing an intravenous needle assembly including a flexible catheter having a smooth surfaced taper at the distal end. In particular, the method concerns forming a smooth surfaced taper at the end of a tube of heat shrinkable plastic material by means of grinding or by the application of heat to the end being tapered, or both.

FIELD OF THE INVENTION

This invention relates generally to a method for shaping plastic tubing and particularly concerns a novel method for forming a smooth taper at the end of a tube.

DISCUSSION OF THE PRIOR ART

Small plastic tubing may be employed for many purposes one very important use for such material is as part of intravenous needle assemblies. These needle assemblies are normally a combination of a substantially rigid sharp pointed needle, which is normally made of stainless steel and may be either solid or hollow, and a flexible catheter closely surrounding the needle and adapted to enter the vein of a patient together with the needle. Intravenous needle assemblies are used primarily for inserting small flexible tubes into a blood vessel of a patient for purposes of extracting blood or for intravenous feeding. The steel needle extends throughout the length and extends slightly beyond the distal or forward end of the catheter so that its sharp end makes initial entry into the patient's skin and blood vessel. When it has been ascertained that the end of the needle and tubing are properly located within a blood vessel, the needle may be removed, leaving the flexible tubing in the position desired for intravenous use.

It will be immediately appreciated that a catheter of this type should preferably be tapered at the forward end so that the diameter of that portion of the assembly entering the vein of the patient is only slightly larger than the needle which makes the initial puncture. By keeping the entering instrument at the smallest possible diameter, the trauma resulting from the puncture is reduced to a minimum. Previous efforts to form a taper at the end of a small piece of plastic tubing have not been entirely satisfactory.

One of the difficulties revolves around the requirements for a small size together with the medical requirement of chemical inertness. It has been found that among the material which may be used, polytetrafluoroethylene and other somewhat similar plastics are preferred. Difficulties arise from the fact that these materials are self-lubricating which, together with their small size and precision requirements, makes them very hard to work with. The general approach has been to use tubing of appropriate size, place it on some type of rotating mandrel and grind one end at a slight angle to form the necessary taper. Due to the inherent flexibility and lubricity of these materials, it is very difficult to grind a proper taper without somewhat deforming the end of the catheter because of the stresses involved in such processing. Such deforming will generally result in either a feather edge which may not smoothly enter the puncture together with the needle or in a somewhat stretched end of the catheter which does not closely embrace the needle.

The results just mentioned give rise to a serious problem concerning the manufacture of intravenous needle assemblies in that it is important that the fit between the needle and the forward end of the catheter be as tight as possible so that the percutaneous opening in the patient will be as small as possible and entry of the needle and catheter will be smooth and easy. The consequences of the catheter not tightly embracing the needle at the tapered end could be extramely serious, possibly even fatal. If the tapered end is thin, but loose around the needle, it might spread considerably upon puncturing the skin of the patient and either fail to enter the puncture at all due to spreading, producing an accordian effect, or it might cause a substantially larger hole to be made before it finally enters the puncture. Due to the natural build-up of pressure during intravenous injections, leakage may occur around the catheter if the resultant entry opening is made too large. Also, if the end of the catheter splits and spreads upon entry, some pieces of the catheter might become separated and migrate through the blood system of the patient causing a possible thrombosis.

Other problems which have occurred in the manufacture of intravenous needle assemblies stem from the fact that the minimum tolerances which are necessary in the manufacture of small polytetrafluoroethylene (TFE) tubing is often too large to enable needles to be made economically in production quantities. This results from the fact that a tube which is slightly smaller than the needle is entirely too tight for proper operation of the assembly, that is, the needle cannot be easily withdrawn from the catheter after entry into the vein of the patient. Also, if the tube is relatively tight around the needle, the point of the needle could shave bits of material off the inside of the catheter upon assembly. These small pieces could very well enter the bloodstream with the consequences mentioned above. However, if the catheter is only slightly larger than the needle, the problem discussed in the previous paragraph will likely result because the forward, tapered end of the catheter does not tightly embrace the needle.

SUMMARY OF THE INVENTION

The primary object of this invention is to provide a novel method of producing a smooth taper on the end of a length of small plastic tubing. An associated object is to make an intravenous needle assembly having a flexible plastic catheter surrounding a sharp needle, the catheter being formed with a tapered forward end which tightly embraces the needle near its forward, pointed end, while the remaining length of the catheter freely and loosely surrounds the corresponding length of the needle.

Broadly speaking, this unique method includes the steps of inserting a mandrel into a length of tubing made of heat shrinkable plastic, the mandrel extending to a point substantially short of the end of the tube; inserting this assembly into a rotatable arbor mounted on a carriage which is movable with respect to a grinding wheel; moving the carriage in one direction to a point such that the freely rotating end of the tube makes contact with the grinding wheel to thereby grind off a portion of the end of the tube to form a taper thereon; and applying heat to the end of the tube to cause it to shrink to a substantially smaller internal cross-section. The process may also include a cut-off step prior to the grinding step in order to impart a precise length to the plastic tube. Alternative embodiments are described such that the grinding and heating steps may take place simultaneously, or a cooling medium may be applied during the grinding process to enable a precision grind to be accomplished and then heat subsequently applied to shrink the tapered end of the tubing. Of primary importance is the fact that the heat generated by friction during the grinding process is normally sufficient to shrink the tip of the catheter to the size desired. However, it is possible to make a useful catheter without the grinding step, that is, causing the proper taper and close contact with the needle by applying heat only to the catheter tip.

A specific embodiment of the invention is concerned with the method of manufacturing an intravenous needle assembly having a catheter formed in accordance with the process described broadly above.

It is preferable that the catheter formed according to the teachings herein be made of heat shrinkable polytetrafluoroethylene (FEP) rather than conventional production type TFE. By using FEP, which is subject to shrinking upon application of heat, much greater tolerances than could be permitted with tubing which is not so similarly deformable may be accepted in the manufacture of the catheter tubing. The tolerance of such tubing may be specified as minus zero or even minus one thousandth to plus several thousandths. With such manufacturing specifications, it is assured that the main part of the tubing will seldom be so small as to be tight upon the shank of the needle and this will allow easy assembly of the needle through the catheter as well as removal therefrom.

By employing this novel process with heat shrink tubing, there are essentially no production rejects based upon incompatibility of catheter and needle. The catheter is large enough to easily allow a needle to be inserted through it and yet has a snug fit at the tapered end so that it tightly embraces the needle to make a medically approved instrument. Furthermore, such FEP tubing may be longitudinally stretched so that, if for any reason, the tip of a catheter does not pass inspection, it may be lengthened simply by pulling it through the fingers and then passing the catheter and hub through the cut-off and grinding steps a second time.

BRIEF DESCRIPTION OF THE DRAWINGS

This invention will be more fully understood from the following detailed description, taken in conjunction with the accompanying drawing, in which:

FIG. 10 is a view similar to FIG. 6 showing apparatus for the grinding and cutting steps applied to a length of tubing without the catheter hub;

FIG. 11 is an enlarged exploded elevational sectional view of the catheter and hub combination;

FIG. 12 is a diagrammatic representation of apparatus used for securing together the elements shown in FIG. 11;

FIG. 13 is an enlarged elevational view of a needle prior to securing it to a hub similar to that shown in FIG. 11, showing the flattened end in somewhat exaggerated fashion; and FIG. 14 is an end view of the needle of FIG. 13.

DESCRIPTION OF THE PREFERRED EMBODIMENT

Figure 1:
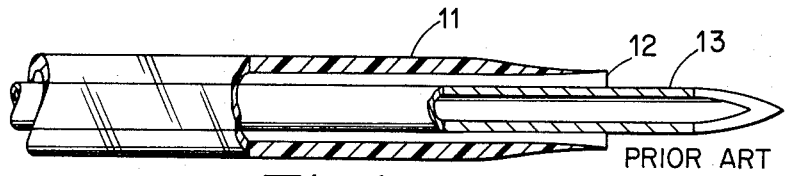
FIG. 1 is a greatly enlarged fragmentary sectional view of the forward end of an intravenous needle assembly of the prior art.

With reference now to the drawing, and specifically to FIG. 1 thereof, there is shown the forward end of an intravenous needle assembly constructed in accordance with the prior art teachings. This greatly enlarged drawing shows a steel needle 13 with all but its sharpened end surrounded by a flexible plastic catheter 11 which has a tapered forward end. It is readily apparent from this figure that due to the grinding process and the thinness of the tapered end, the catheter tends to flare slightly at the very tip. This is caused primarily because of the stresses involved in the grinding of these particular materials. It can be seen how catheter 11 has a slight separation 12 at the end between its interior wall and the shank of needle 13. This gap may be of sufficient size to permit the edges of the skin at the puncture made by the needle to enter between the catheter and needle and cause spreading or cuffing of the catheter to such an extent that the edges of the catheter might split and even fail completely to enter the puncture because of an accordian effect, where the catheter slides up the shank of the needle. The resulting trauma to the patient is easily imagined. Even if the catherter does enter the puncture after a certain amount of spreading and splitting, the percutaneous opening is likely to be enlarged and thereby permit leakage around it due to the pressures involved during the injection of fluid into the vein. Furthermore, rough edges such as those just described may cause irritation within the blood vessel with consequent blood clotting and thrombosis which could even lead to a fatality. Also, with such spreading and splitting of the catheter end, it is possible that small plastic particles might be completely dislodged from the catheter and enter the bloodstream of the patient, thereby leading to a possible thrombosis at some unpredictable time and location.

Figure 2:
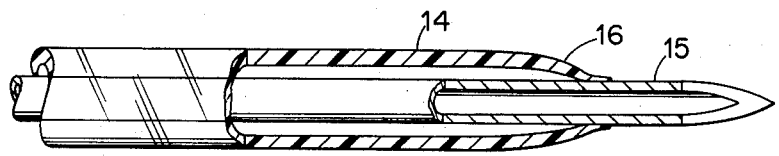
FIG. 2 is a similarly enlarged fragmentary sectional view of the forward end of an intravenous needle assembly constructed in accordance with the principles of this invention.

FIG. 2 shows a similar portion of an intravenous needle assembly constructed in accordance with the principles of the novel process disclosed herein. By following the process steps disclosed herein, it is possible to form the distal end of the catheter 14 so that it will have the desired taper 16 and at the same time will tightly embrace the shank of needle 15, thereby preventing the possibility of tissue entering between the catheter and the needle. It is also apparent from this figure that needle 15 is loosely enclosed within catheter 14 at all points rearward of taper 16. The needle assembly produced by this process is provided with a catheter which allows no gap at the tapered point between it and the needle shank and presents a cross section which gradually increases to the full outside catheter diameter so that upon entry of the catheter into the puncture in the patient, the puncture is not split or enlarged but is merely stretched to easily fit around the catheter. With this carefully formed assembly, the puncture in the patient is never any larger than the catheter so there is no danger of leakage around the outside thereof. Furthermore, with this structure the trauma involved in removing the needle from the catheter is substantially reduced because the only friction involved is at the very tip end of the needle and involves only a very small area of mutual contact. The needle is easily withdrawn from the remainder of the length of the catheter. Conversely, the effort and time involved in assembling intravenous needles made in accordance with this invention are greatly reduced because the needle is easily passed through most of the length of the catheter and is snugly engaged only at the tip thereof. The catheter of the needle of this invention is made of expanded polytetrafluoroethylene tubing (FEP) or other heat shrinkable plastic material which may be substantially transparent and is compatible with medical use. Acceptable materials may also include polyvinylchloride, polyethylene and polypropylene, among others.

Figure 3:
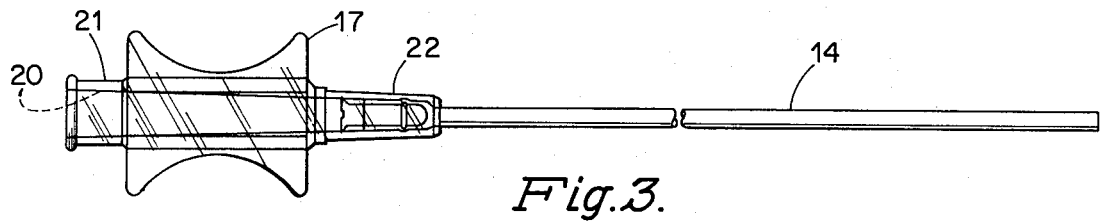
FIG. 3 is an elevational view of a catheter and hub combination prior to the tapering step.
Figure 4:
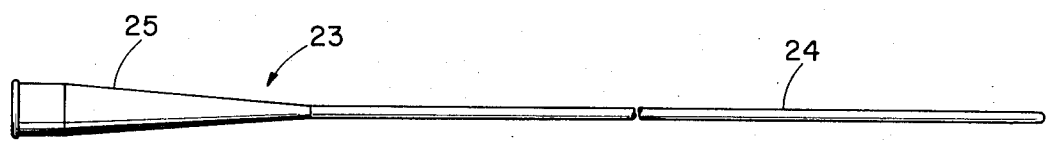
FIG. 4 is an elevational view of the mandrel used in the cutting and grinding steps of this invention.
Figure 5:
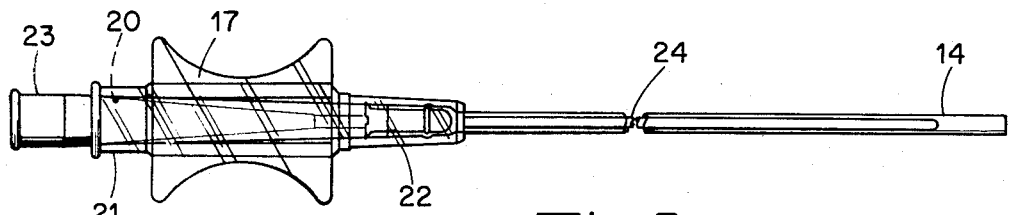
FIG. 5 is an elevational view of the catheter and hub of FIG. 3 having the mandrel of FIG. 4 inserted therein.

The process of manufacturing an intravenous needle assembly is best described with reference to FIGS. 3–7 of the drawing. FIG. 3 shows catheter 14 and catheter hub 17 formed as a unit. The hub is preferably formed of a polycarbonate plastic material which is substantially rigid while also being transparent, and has a Luer-Lok 21 at the rearward end and a smooth external taper 22 at the forward end adjacent the catheter. The Luer-Lok 21 is also formed with an internal smooth taper 20 adapted to mate with other components as will be discussed hereinbelow. FIG. 4 shows a mandrel 23 having an elongated shank 24 with a rounded point, and a smooth taper 25 at its rearward end. This mandrel is configured to fit within the Luer-Lok end of the catheter and hub combination of FIG. 3 with the tip of the mandrel remaining within the catheter short of the distal end thereof, as shown in FIG. 5. Here the mandrel has been inserted into the hub and catheter unit with taper 25 firmly seated within Luer-Lok 21 of hub 17.

Figure 6:
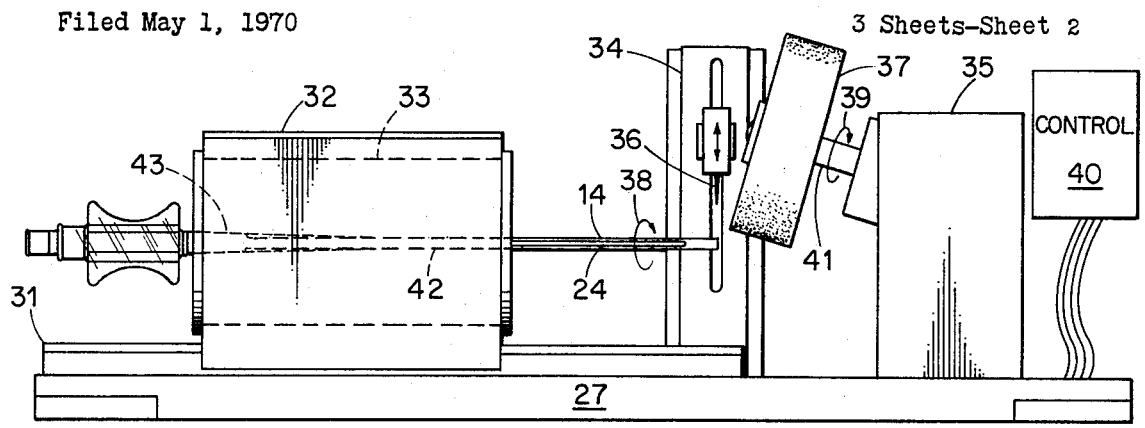
FIG. 6 is a diagrammatic representation of apparatus which may be utilized for cutting the catheter to a predetermined length and for grinding the end to form the taper thereof.

An example of apparatus adapted to shape the end of catheter 14 is shown diagrammatically in FIG. 6. This apparatus has a base 27 to which rail members 31 are secured. A carriage 32 is mounted for longitudinal motion on rails 31. Carriage 32 includes a rotatable arbor 33 which is adapted to hold a length of small plastic tubing for rotation thereof. Also secured to base 27 are cutting mechanism 34 and grinding mechanism 35. Cutter 34 includes a knife blade 36 mounted for controlled vertical motion. Grinding mechanism 35, which is normally fixed relative to base 27, has a grinding wheel 37 rotatable on shaft 41.

The apparatus of FIG. 6 operates in the following manner. Arbor 33 has a longitudinal bore 42 therethrough with an internal taper 43 at the rearward end. This taper is adapted to receive either taper 22 of hub 17 or taper 25 of mandrel 23. The hub 17 is firmly seated within arbor 33 by wedging taper 22 and opening 43 together while carriage 32 is at its first or home position. The apparatus operation sequence is then started by the machine operator and automatically shapes the tip of catheter 14. Arbor 33 commences rotating in one direction as indicated by arrow 38, while carriage 32 proceeds from the home position to a second position where cutting mechanism 34 acts to lower knife blade 36 into contact with catheter 14 at a point slightly rearward of its forward tip. Because the catheter is rotating quite rapidly, it is quickly cut to a precise length with respect to hub 17. Knife blade 36 then automatically retracts upward out of the way of the catheter, and carriage 32 advances to a third position where it makes contact with grinding wheel 37. The grinding wheel rotates as indicated by arrow 39 so that the contacting surfaces of grinding wheel and catheter are traveling in relative opposite directions. Grinding wheel 37 has a very fine grain surface and may be coated with diamond dust so that the resulting tapered surface of catheter 14 is very smooth.

With this apparatus, the proper amount of material is very quickly and accurately removed from the end of the catheter to form the taper. At the same time, the frictional contact between the grinding wheel and catheter generates a sufficient amount of heat to cause the heat shrinkable tubing to decrease substantially in cross section, essentially shrinking away from the grinding wheel.

There are several notable aspects of this process for shaping the end of the flexible tube which may be used as the catheter of an intravenous needle assembly. Due to the heat induced shrinkage, the inside diameter at the shaped end of the tube is significantly smaller than its diameter throughout the remainder of its length. The removal of material on an angle makes the distal end relatively thin with a gradual increase in catheter wall thickness until full thickness is reached when the catheter reaches full diameter, a short distance rearward from the distal end. One feature of heat shrinkable plastic tubing is that the shrinkage is greatest where the tubing is thinnest so that the tapered end is slightly convex externally. This fact is quite significant for a catheter as will be explained hereinbelow.

Figure 7:
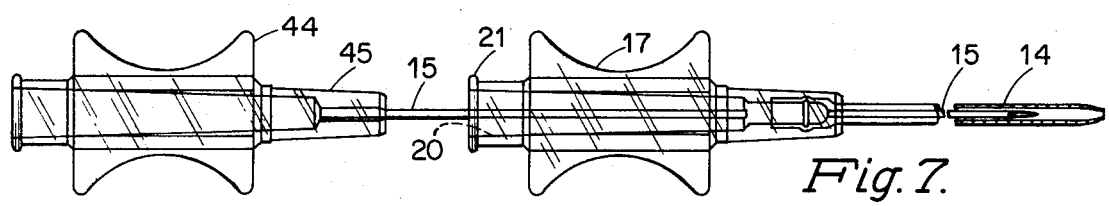
FIG. 7 shows an incompletely assembled intravenous needle and catheter with the needle extending partially into the catheter.

After the catheter tip has been properly shaped, carriage 32 reverses direction and moves to its first position whereupon arbor 33 ceases rotating. Hub 17 is removed from the arbor, mandrel 23 is removed from the hub and the final step in the assembly of the intravenous needle assembly, that of inserting the rigid needle 15 into catheter 14, as shown in FIG. 7, is performed. Control 40, which controls the operation of the apparatus of FIG. 6, may be any conventional type of machine control and need not be further described here.

For storage, shipping and sterilizing purposes, the needle and catheter are not normally fully assembled to their operative condition with taper 45 of needle hub 44 firmly seated in internal taper 20 of Luer-Lok 21, but they are only loosely mated with the tip of the needle remaining in a position rearward of the catheter tip. This allows sterilizing gases to enter hub 17 at its rearward end, pass through catheter 14 around needle 15 which it loosely surrounds and out through tapered end 16 of the catheter past the tip of the needle. The fact that sterilization of the needle assembly may be accomplished without completely separating the two major components thereof is another significant advantage of the process of this invention.

When the time approaches for use of a needle assembly, it is removed from its protective sterile package and the two major components are securely engaged so that the distal end of the assembly is as shown in FIG. 2. The tapered side of the needle, which is aligned with one flat side of hubs 17 and 44, is facing upward away from the site of the injection when the entry into the patient's skin is made. With reference to FIG. 2, it is immediately apparent that the skin which tightly embraces the shank of needle 15 will tend to force tip 16 of the catheter more tightly into engagement with the needle, rather than going between the catheter and needle. This results because of the convex shape of the taper and the fact that the catheter already closely fits around the needle, leaving no gap where the skin could possibly enter. The smoothness of the taper will force the skin to stretch to a diameter slightly larger than the needle so as to accommodate the catheter as it enters the puncture. When it has been determined that the catheter has been properly placed, the rigid needle is removed and the remaining catheter may be used as necessary for removal of blood or for intravenous injection.

Figure 8:
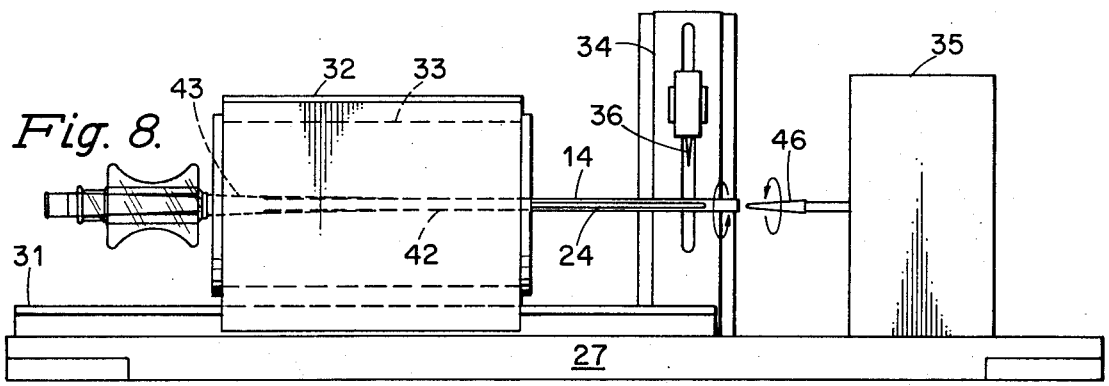
FIG. 8 shows apparatus similar to that shown in FIG. 6 but with a different grinding tool which is used for internal grinding of the end of the catheter.

An alternative method of forming the taper on the end of catheter 14 is shown in FIG. 8. Except for the grinding tool and its shaft, the structure of FIG. 8 is identical to that of FIG. 6. Grinding tool 46 is a narrow tapered stub which is aligned wtih the axis of arbor 33. As carriage 32 advances to its third position for tapering, the tip of grinding tool 46 enters catheter 14 and grinds some of the material away from the inside. The heat generated by this process also causes the catheter to shrink and when it is removed from operative contact with grinding tool 46, it has a form much the same as previously described for the external grinding method. One advantage of this step is that the outside of the catheter tip remains as smooth as the entire tubing was when manufactured, which is somewhat smoother than the catheter 16 when it has been ground. This further facilitates the ease of entry into the puncture through the skin of the patient.

Figure 9:
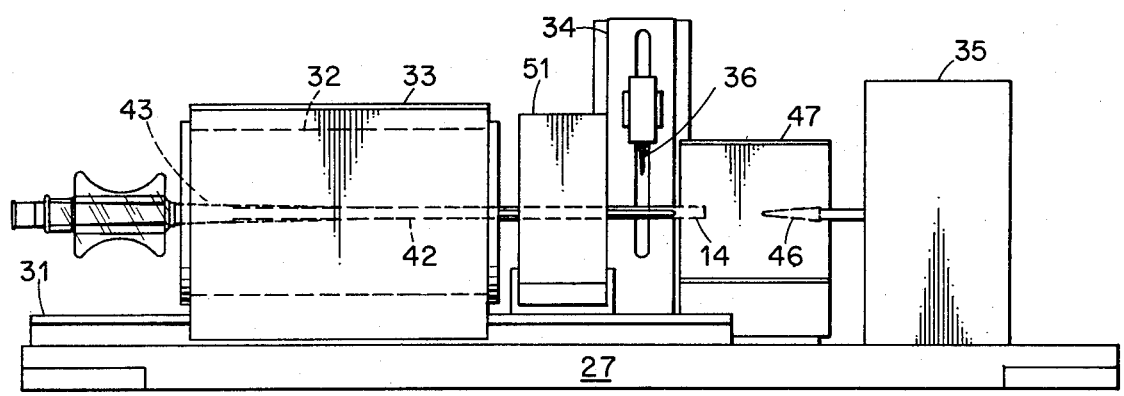
FIG. 9 is an alternative embodiment showing the apparatus of FIG. 6 together with means for cooling the grinding tool and catheter during grinding, and heating means for shaping after grinding.

Another alternative embodiment is shown in FIG. 9, wherein the apparatus is generally as shown in FIG. 8 except that a cooling bath 47 of some suitable fluid such as liquid nitrogen is used to keep the catheter tip and the cutting tool cool throughout the grinding process so that no heat shrinking takes place. After the grinding step has been completed, carriage 32 moves rearwardly to a fourth position to place the tip of catheter 14 in operative relation with heater 51. At this point heat is locally and precisely applied to the tip of catheter 14 to shrink it to the correct size. Carriage 33 is then backed all the way to its first position on rails 31 and the remaining steps are the same as previously described.

It is important to note that this process is not limited to making intravenous needle assemblies. The invention is equally useful in making tapered tubing of heat shrinkable material for any suitable purpose. FIG. 10 shows the apparatus of FIG. 6 operating upon a length of plastic tubing only, without a hub attached. It can be seen with reference also to FIG. 4 that the same size tubing may be tapered without modification of any of the equipment. Mandrel 23 is inserted into tubing 52 sufficiently so that the smaller end of taper 25 of the mandrel tightly engages the rearward end of the tube. The mandrel and tube are then inserted into arbor 33 where the mating taper allows the tube to be securely wedged therein between the mandrel and arbor bore. The process of shaping the tube's distal end then proceeds as previously described. The tube, after separation from the arbor and mandrel, may then be used for whatever purpose is desired. The process just described could also be part of the manufacture of an intravenous needle assembly where the catheter is shaped before being secured to the hub.

The method by which the catheter 14 and the hub 17 are joined will now be described in detail with reference to FIGS. 11 and 12. A length of heat shrinkable plastic tubing 14, slightly longer than the final length needed for the needle assembly, is combined with substantially rigid ferrule 53 by stretching the rearward end of the tubing over it. This part of the assembly is facilitated by heating the ferrule to the shrinking temperature of the tubing, approximately 270° F. and then inserting it into the end of the tubing. This procedure will cause the tubing to shrink about the ferrule and form an extremely tight fit. Ridge 54 assists in preventing the tube from sliding off the ferrule. The ferrule and tube are then inserted through the opening in the rear of hub 17. As noted previously, the opening inside of Luer-Lok 21 is tapered to fit a similar taper 45 on the forward end of needle hub 44. This opening continues on through the hub and continues to taper near the forward end where the central hub opening is necked down as shown in FIG. 11. As thus configured, the end of the tube just fits the opening and slides easily through it. The ferrule, of course, wedges into the opening well inside the hub as shown in FIG. 3. The partly assembled hub, catheter and ferrule are then inserted in jig 55 of ultrasonic apparatus 56, with the tube extending downward. Ultrasonic head 57 has a shaft 61 and is mounted upon frame 62 for vertical motion as indicated by arrow 58. When the hub and catheter unit has been properly placed, the ultrasonic machine is energized and shaft 61, which is axially aligned with hub 17, starts to move downward with head 57. Ferrule 53 and tube 14 are forced downward and wedged tightly in hub 17, the ultrasonic vibrations causing the material of the hub to actually flow around the ferrule, particularly the flared rearward end thereof. When head 57 has reached stop 63 and reverses its direction, the ferrule is in its proper location within hub 17. Tube 14 is very tightly wedged between the ferrule and hub and some of the hub material extends over the flared rearward end of the ferrule and fills notch 64. There may be one or more such notches in the rim of the ferrule and these provide a positive means for preventing rotation of the tube within the hub. The inner tapered surface of the flared rearward ferrule rim provides a positive means for guiding the tip of needle 15 into the center of the catheter upon assembly of the needle and catheter components.

With reference to FIGS. 12–14, it may be seen how needle 15 is secured to hub 44. The rearward end 65 of the needle is somewhat flattened by an appropriate means such as a press. The cross sectional area of the opening is substantially the same through the partially flattened portion as through the remainder of the needle, as is clearly shown in FIG. 14, so that the flow of fluid which may pass therethrough will not be impeded. The needle may now be wedged into its hub in the same manner as the catheter, using the apparatus illustrated in FIG. 12 and the steps just described with respect to the catheter and hub unit. As a specific example, the forward portion of the tapered bore through hub 44 may be 0.035 inch in diameter while the shank of the needle is 0.036 inch in diameter. Thus, there is initially a force fit between needle and hub. The flattening step then expands the major radius of the needle approximately 0.005 inch causing a total interference of approximately 0.012 inch on these sides. The ultrasonic assembly step causes the material of hub 44 to flow somewhat to fit around the wedge-shaped and flattened end of the needle to firmly anchor the two elements together. It is desirable that the flat sides of the needle be parallel with the flat taper at the piercing end of the needle so that the proper orientation can be maintained when the needle is fixed to the hub. Thus, if the flat sides of the hub correspond to the tapered side of the needle, the user can easily insure that the needle is properly oriented for entry into the patient's tissue.

The process described for making intravenous needle assemblies is very economical and precise. By using tubing which is slightly larger than the needle, certain advantages result as discussed above, among which is the advantage of having essentially no rejects caused by an interference fit between the needle and catheter or caused by the fit being too loose, which in the prior art makes the needle assembly substantially inoperative because of the possibility of the catheter failing to enter the percutaneous opening.

Examples of particular parameters of this invention are as follows: for a 16 gauge intravenous needle assembly, a 19 gauge needle having an outside diameter of 0.042 inch is used, together with a catheter having an inside diameter of 0.045 inch, shrinkable to 0.039 inch. It must be recognized that these are examples only and that they do not define precise dimensions. For use with an 0.042 inch needle, tubing may be specified as having a tolerance of minus zero, plus 0.007 inch. The plastic tubing will normally have a wall thickness of approximately 0.008 inch. Normal temperatures used for shrinking the FEP tubing will be at least as high as 250° F. but of course it must be substantially lower than the melting temperature of the plastic. The appropriate temperatures will vary somewhat with the different materials being used.

Many changes and modifications will likely occur to those skilled in this art. For example, carriage 32 need not ride on rails 31 but other suitable means for providing reciprocal motion may be used. As a matter of fact, the carriage need not move at all, it being sufficient if there is relative motion possible between the various units of the cutting, grinding and heating apparatus. The cutting and grinding apparatus shown are diagrammatic and the actual machinery may have any suitable structure. Furthermore, the intravenous needle assembly may use a solid needle in place of the hollow one shown because it is normally used only for puncturing purposes. Such modifications are fully within the scope of this invention.

What is claimed is:

1. A method for forming a taper at an end of a length of heat shrinkable plastic tubing, comprising the steps of:
   inserting a mandrel into one end of said length of tubing, said mandrel having a centering taper near its rearward end over which said tubing fits tightly;

inserting said mandrel and tubing into a rotatable arbor so that the distal end of said tubing extends outwardly therefrom;

rotating said mandrel and tubing; and removing a portion of the material of said tubing at said distal end thereof, said material removing step generating heat to thereby cause said distal end to shrink in diameter thereby forming the desired taper.

2. The method according to claim 1 wherein said material removing step is accomplished by means of a grinding tool rotating in contact with said distal end of said tubing.

3. The method according to claim 2 wherein:
said arbor is movable with respect to said grinding tool in the direction of the axis of rotation of said arbor.

4. The method according to claim 3 wherein said arbor is rotatably mounted to a carriage adapted for reciprocal movement with respect to said grinding tool, said carriage being in a first position when said mandrel and tubing are inserted into said arbor.

5. The method according to claim 4 and further comprising the step of cutting said tubing to a precise length prior to the material removing step.

6. The method according to claim 5 wherein:
said cutting step is accomplished with said carriage in a second position; and
said material removing step is accomplished with said carriage in a third position; said method further comprising the steps of:
moving said carriage to said first position;
removing said mandrel and tubing from said arbor; and
removing said mandrel from said tubing.

7. The method according to claim 2 wherein during said material removing step, said arbor rotates in one direction and said grinding tool rotates in such a direction that the contacting surfaces of said rotating elements proceed in opposite directions with respect to each other.

8. The method according to claim 1 wherein said tubing is made of expanded polytetrafluoroethylene.

9. A method for forming a taper at an end of a length of heat shrinkable plastic tubing, comprising the steps of:
inserting a mandrel into one end of said tubing, said mandrel having a centering taper near its rearward end over which said one end of said tubing fits tightly;
inserting said mandrel and tubing into a tapered bore in a rotatable arbor, so that said one end of said tubing is wedged between said mandrel and said arbor bore and the other end of said tubing extends outwardly from said arbor, said arbor being mounted to a carriage, said carriage being adapted for reciprocal movement in the axial direction of said arbor, said carriage being in a first position when said mandrel and tubing are inserted into said arbor;
rotating said arbor;
moving said carriage forward to a second position;
cutting off a portion of said tubing at said other end to conform said tubing to a precise length;
moving said carriage forward to a third position where said other end of said tubing makes contact with a grinding tool;
removing a portion of the material of said tubing by means of said grinding tool to thereby form a taper;
applying heat to said tapered end of said tubing, thereby causing said end to shrink to a substantially smaller diameter;
moving said carriage rearwardly to said first position;
removing said mandrel and tubing from said arbor; and
removing said mandrel from said tubing.

10. The method according to claim 9 wherein said material removing step is accomplished by grinding the outer surface of said distal end of said tubing at an angle, said grinding generating friction to provide sufficient heat directly to said tubing to cause said shrinking to take place.

11. The method according to claim 9 wherein said material removing step is accomplished by grinding the inner surface of said distal end of said tubing at an angle, said grinding generating sufficient friction to provide directly to said tubing the heat necessary to cause said shrinking to take place.

12. The method according to claim 10 wherein said other end of said tubing and said grinding tool are immersed in a cooling medium during said material removing step so that shrinkage does not then occur; said method further comprising the step of:
moving said carriage rearwardly to a fourth position prior to said heat applying step.

13. The method according to claim 9 wherein the distal end of said mandrel within said tubing is disposed rearwardly from said other end of said tubing.

14. A method for forming a taper at the distal end of an intravenous needle assembly catheter, the rearward end of the catheter being secured to a hub having a bore therethrough which is tapered outwardly at its rearward end and having an external taper at its forward end, said method comprising the steps of:
inserting a mandrel into said hub and catheter unit, said mandrel having a centering taper near its rearward end which tightly engages said tapered bore in said catheter hub;
inserting said mandrel, hub and catheter combination into a rotatable arbor, said arbor being mounted to a carriage adapted to provide reciprocal movement of said arbor in the axial direction thereof, said carriage being in a first position when said mandrel, hub and catheter combination are inserted into said arbor;
rotating said arbor; and
removing a portion of the material of said catheter at its distal end, said material removing step generating heat to thereby cause said distal end to shrink in diameter thereby forming the desired taper.

15. The method according to claim 14 wherein:
said material removing step is accomplished by frictional contact between a grinding tool and said distal end of said catheter, said method further comprising:
rotating said grinding tool; and
then removing said carriage with respect to said grinding tool so that contact is made between said catheter and said grinding tool.

16. A method for manufacturing an intravenous needle assembly comprising the steps of:
inserting a substantially rigid ferrule into the rearward end of a length of flexible heat shrinkable plastic tubing, the external diameter of said ferrule being larger than the inside diameter of said tubing so that said ferrule and tubing are tightly engaged;
inserting said ferrule and tubing through a tapered bore in a substantially rigid catheter hub wherein said ferrule and rearward end of said tubing are prevented from passing through the forward end of said catheter hub bore by the interference fit therebetween;
mounting said catheter hub, ferrule and tubing combination in a jig on an ultrasonic bonding machine;
ultrasonically securing said ferrule and tubing to said catheter hub to form the catheter portion of said needle assembly by contacting said ferrule with the vibrating probe of said ultrasonic bonding machine whereby said rearward end of said tubing is wedged between said ferrule and the inside surface of said catheter hub;
inserting a mandrel into said catheter hub, ferrule and tubing combination so that the distal end of said mandrel is within said tubing and located rearwardly of the distal end thereof;
inserting said catheter portion and mandrel combination into a bore in a rotatable arbor, said bore having an expanding taper at its rearward end, a forward external taper on said catheter hub engaging securely in said tapered arbor bore;

cutting off a portion of said tubing at said distal end thereof to conform said tubing to a precise length;

removing a portion of the material of said tubing at its distal end, said material removing step generating heat to thereby cause said distal end to shrink in diameter thereby forming the desired taper;

removing said mandrel from said catheter portion;

partially flattening the rearward end of a substantially rigid needle sharpened at its forward end, the opening through said partially flattened end having substantially the same cross sectional area as the round bore of said needle;

inserting said needle through a tapered bore in a substantially rigid needle hub wherein said sharpened end of said needle extends forward from said needle hub and said partially flattened end of said needle interferes with the forward end of the bore through said needle hub;

mounting said needle hub and needle in a jig on an ultrasonic bonding machine;

ultrasonically securing said needle to said needle hub to form the needle portion of said needle assembly by contacting said ferrule with the vibration probe of said ultrasonic bonding machine whereby said partially flattened end of said needle is wedged into said bore in said needle hub;

mating said needle and catheter portions to form said intraveneous needle assembly, said hubs fitting together while said needle extends through the length of said tubing, its sharpened end extending beyond the tapered end of said tubing.

References Cited

UNITED STATES PATENTS

| | | | |
|---|---|---|---|
| 2,663,976 | 12/1953 | Jacoby | 51—227 H |
| 2,882,061 | 4/1959 | Johnson | 51—227 |
| 2,027,962 | 1/1936 | Currie | 128—Heat Shink Dig. |
| 2,669,073 | 2/1954 | Bendrickson | 51—227 |
| 3,388,703 | 6/1968 | Bowes | 128—214.4 |

OTHER REFERENCES

Kolb, D. J., "Designing Plastic Parts for Ultrasonic Assembly," Machine Design, Mar. 16, 1967.

BENJAMIN A. BORCHELT, Primary Examiner

J. V. DORAMUS, Assistant Examiner

U.S. Cl. X.R.

156—84; 128—214.2; 51—165 T

UNITED STATES PATENT OFFICE
CERTIFICATE OF CORRECTION

Patent No. 3,694,280  Dated September 26, 1972

Inventor(s) William A. Hoef

It is certified that error appears in the above-identified patent and that said Letters Patent are hereby corrected as shown below:

Column 1, line 12, "methods" should read --method--;
         line 28, after "purposes" insert --and--.

Column 2, line 11, "extramely" should read --extremely--.

Column 8, line 33, after "using" insert --plastic--.

Column 10, line 44, "removing" should read --moving--.

Signed and sealed this 22nd day of May 1973.

(SEAL)
Attest:

EDWARD M. FLETCHER, JR.            ROBERT GOTTSCHALK
Attesting Officer                  Commissioner of Patents